United States Patent [19]
Watts

[11] Patent Number: 5,899,459
[45] Date of Patent: May 4, 1999

[54] TRACK JOINT SEALING ASSEMBLY HAVING A CERAMIC SEAL MEMBER AND ELASTOMERIC SPRING MEMBERS FOR SEALING A TRACK JOINT IN A TRACK CHAIN

[75] Inventor: Kenneth R. Watts, Washington, Ill.

[73] Assignee: Caterpillar Inc., Peoria, Ill.

[21] Appl. No.: 08/688,347

[22] Filed: Jul. 30, 1996

[51] Int. Cl.⁶ .................................................. F16J 15/16
[52] U.S. Cl. ............................ 277/92; 277/85; 277/96.2
[58] Field of Search ............................ 277/92, 85, 96.2

[56] References Cited

U.S. PATENT DOCUMENTS

| | | | |
|---|---|---|---|
| Re. 32,646 | 4/1988 | Wentworth | 277/40 |
| 3,624,809 | 11/1971 | Beringa | 277/92 |
| 3,926,443 | 12/1975 | Fenerty et al. | 277/96 |
| 4,094,514 | 6/1978 | Johnson | 277/92 |
| 4,111,436 | 9/1978 | Yazawa | 277/92 |
| 4,421,327 | 12/1983 | Morley et al. | 277/84 |
| 4,436,315 | 3/1984 | Hatch et al. | 277/92 |
| 5,183,318 | 2/1993 | Taft et al. | 305/39 |
| 5,257,858 | 11/1993 | Taft | 305/58 PC |
| 5,302,012 | 4/1994 | Dester et al. | 305/56 |

*Primary Examiner*—William A. Cuchlinski, Jr.
*Assistant Examiner*—Christina Annick
*Attorney, Agent, or Firm*—Mark D. Becker

[57] ABSTRACT

A track seal assembly adapted to seal a track joint includes a track link and a first ceramic seal member. The track seal assembly further includes a first spring member positioned between the track link and the first ceramic seal member. Additionally, the track seal assembly includes a bushing having an end face. The track seal assembly also includes a second ceramic seal member secured to the end face of the bushing, wherein the first ceramic seal member contacts the second ceramic seal member so as to form a seal interface.

8 Claims, 7 Drawing Sheets

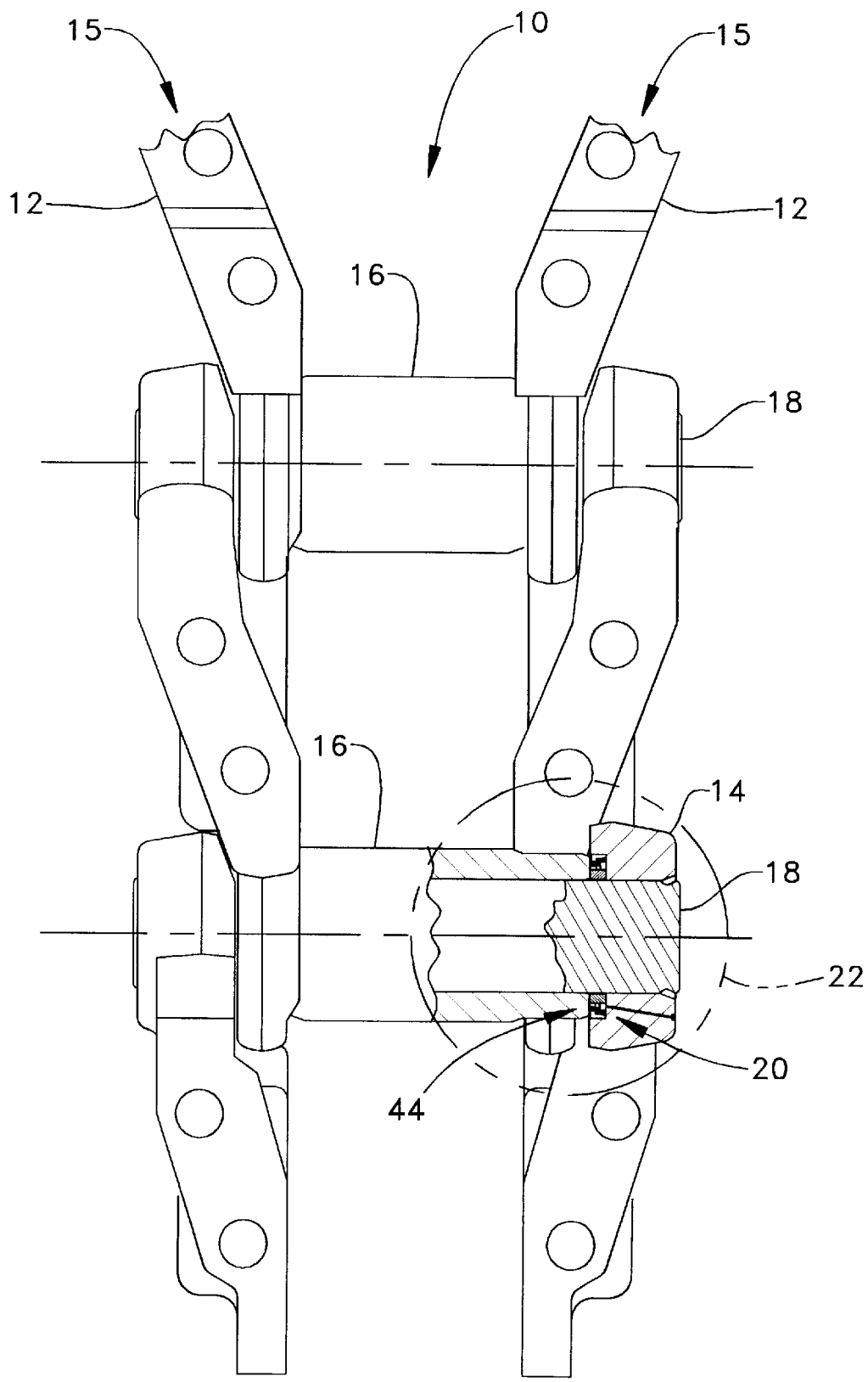
Fig_2

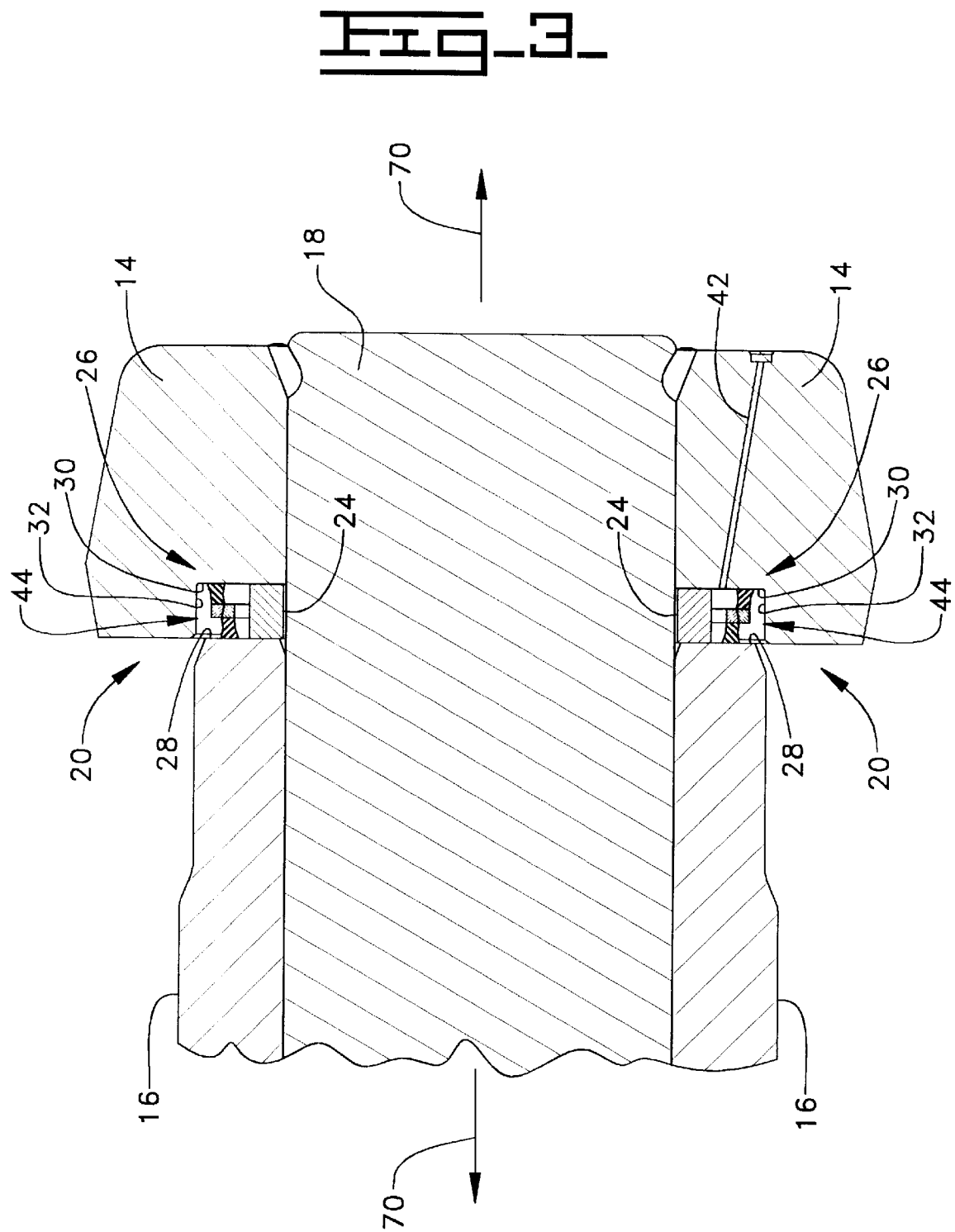

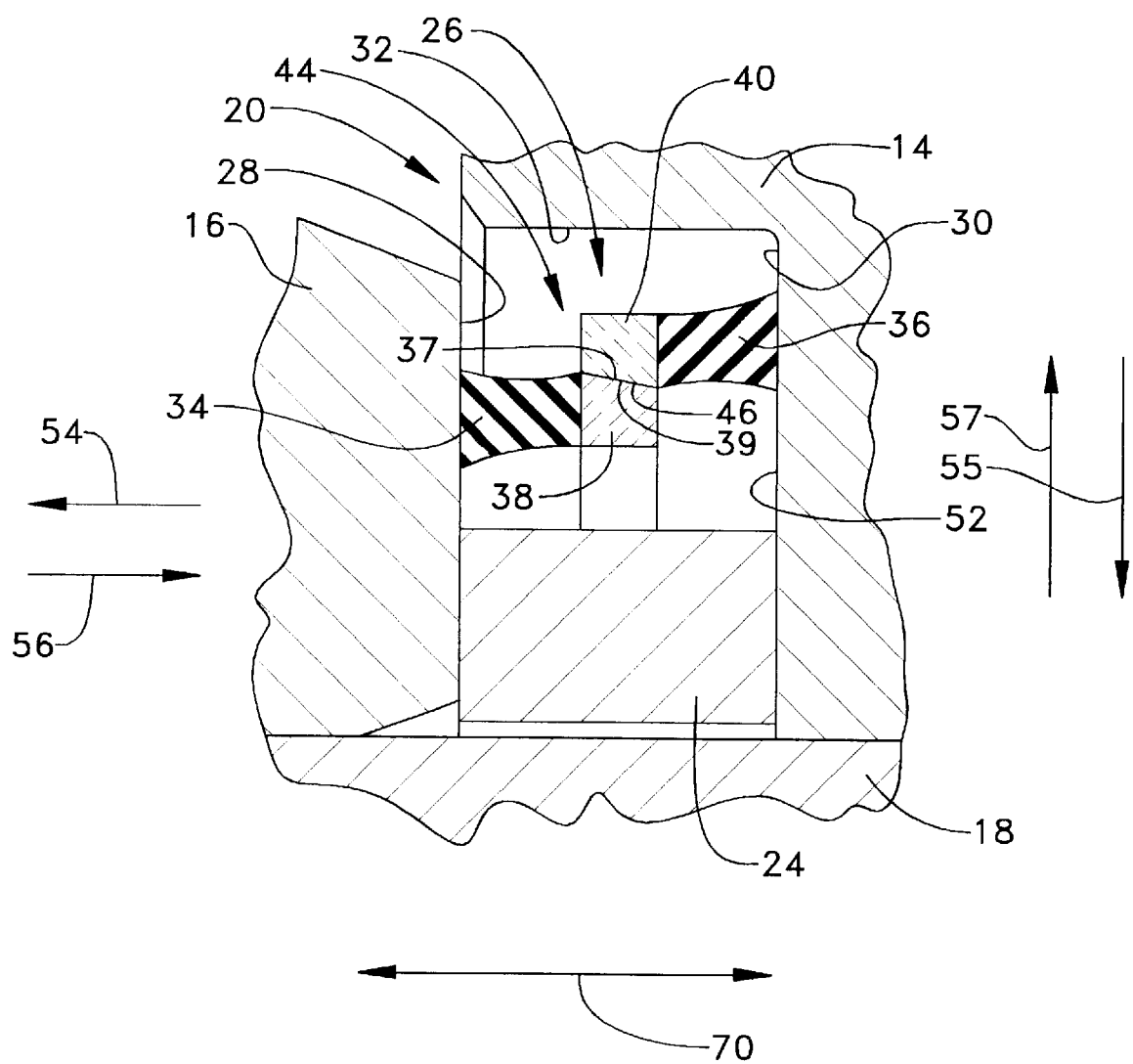

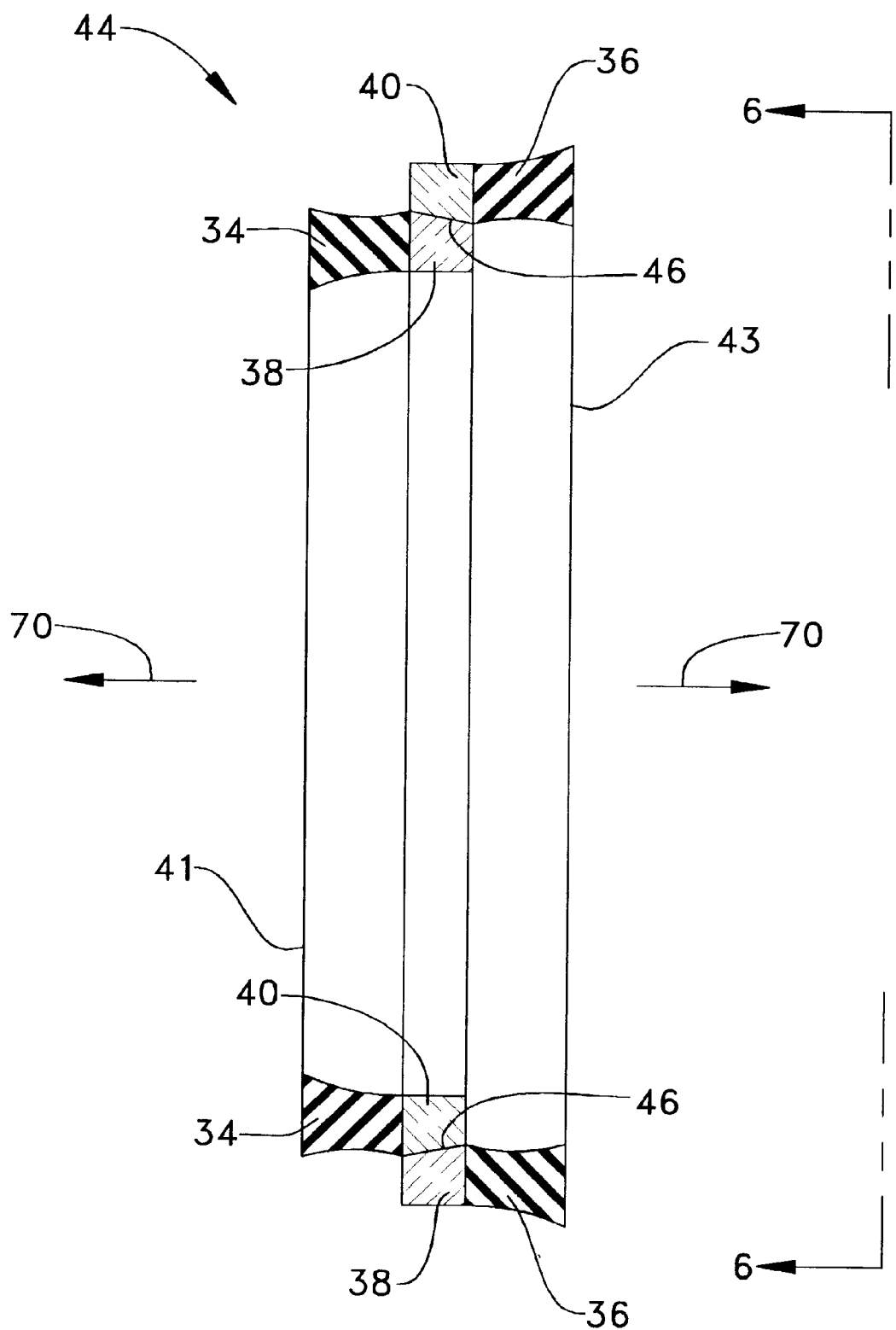
Fig_5_

Fig_6_
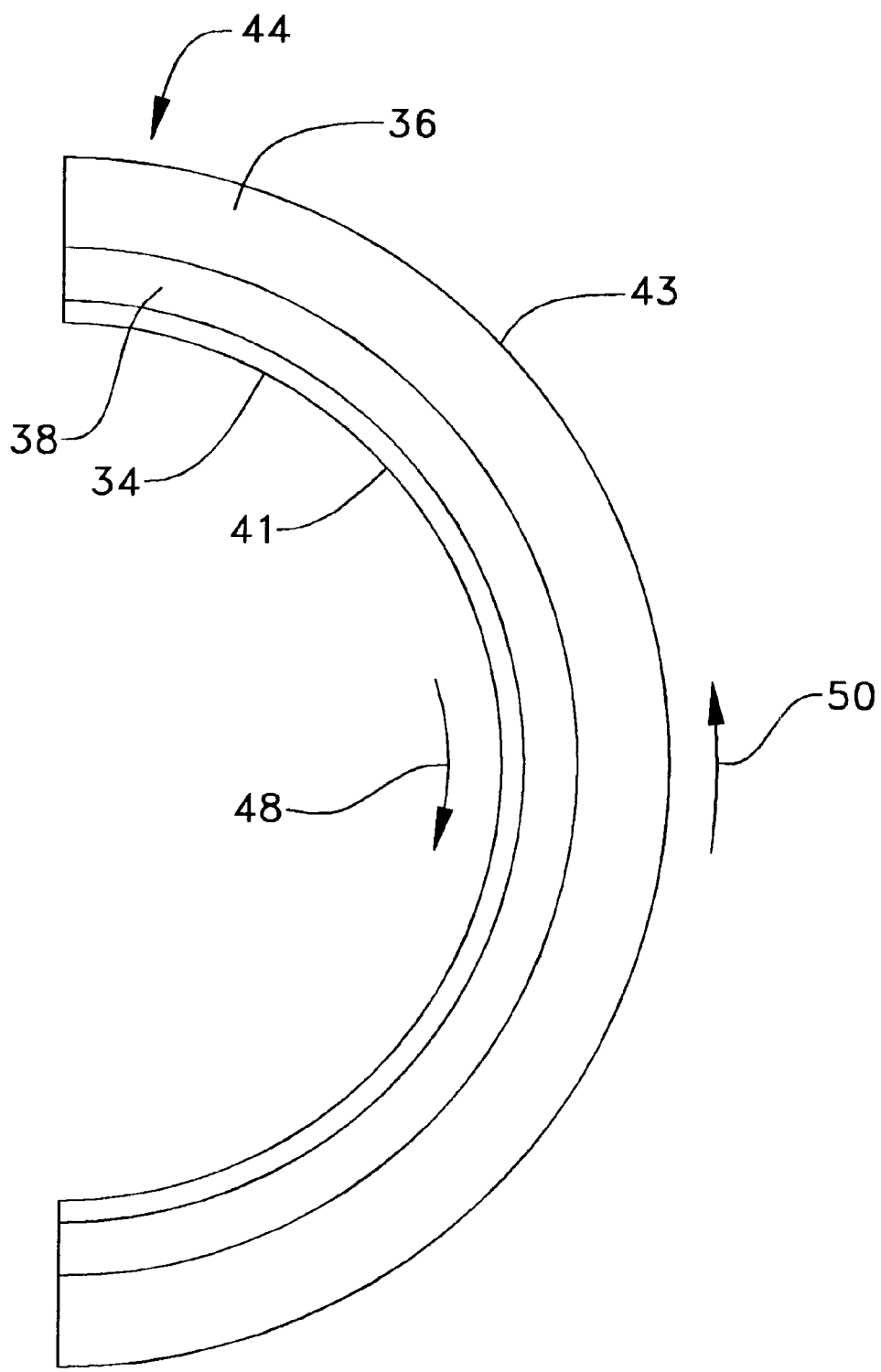

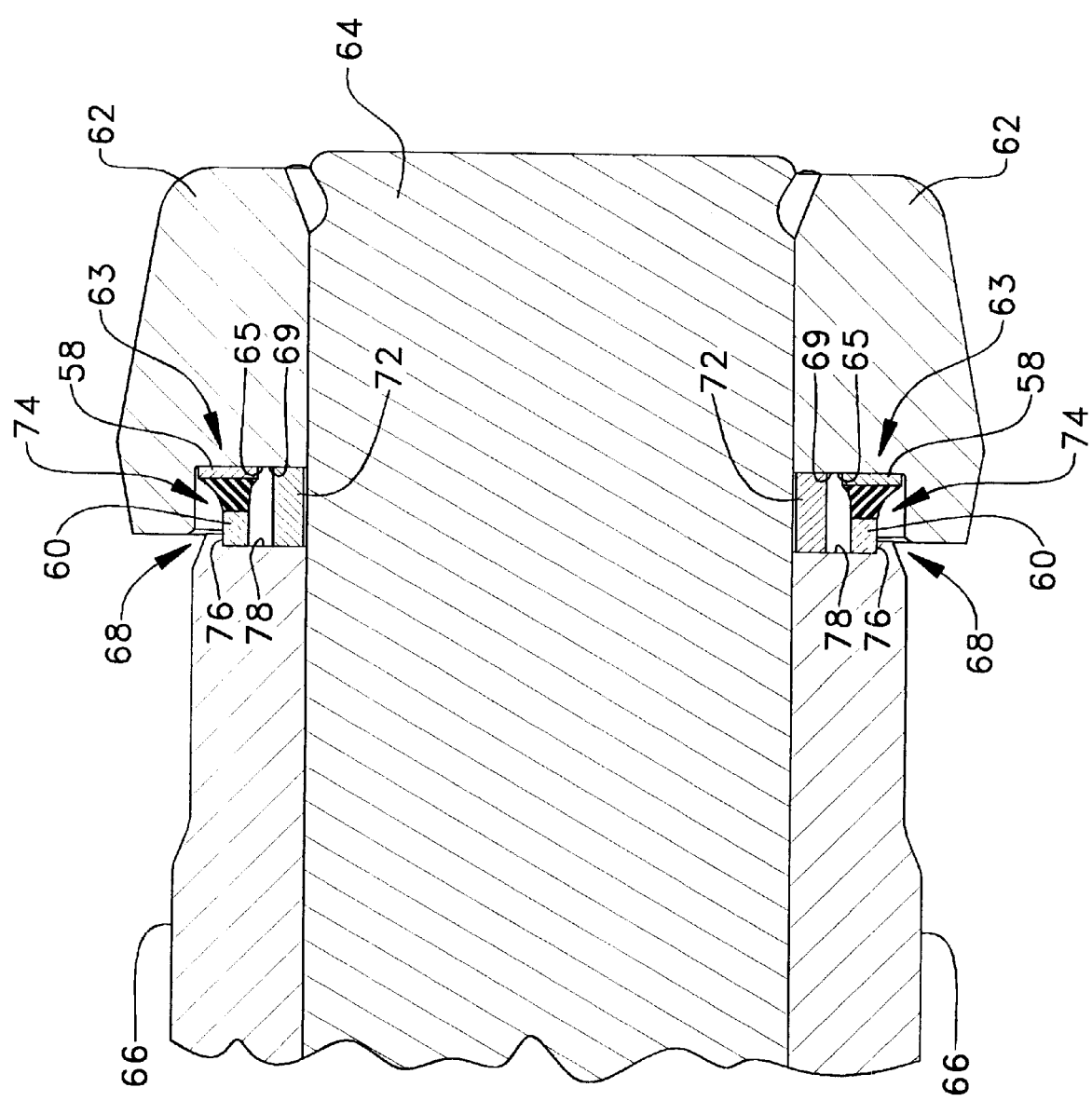
Fig_7_

TRACK JOINT SEALING ASSEMBLY HAVING A CERAMIC SEAL MEMBER AND ELASTOMERIC SPRING MEMBERS FOR SEALING A TRACK JOINT IN A TRACK CHAIN

BACKGROUND OF THE INVENTION

The present invention generally relates to sealing joints in moving vehicles, and more particularly relates to an apparatus for sealing a track joint in a track chain of a crawler tractor.

Crawler tractors, such as a bulldozer, typically have a sprocket, an idler, a track chain and a number of track shoes attached to the track chain for propelling the tractor over the ground. During use of the crawler tractor the sprocket rotates and engages the track chain, thereby causing the track chain, along with the attached track shoes, to rotate around a path defined by the sprocket and the idler. The rotation of the track chain causes the track shoes to engage the ground, thereby propelling the crawler tractor over the ground to perform various work functions.

Track chains generally include a pair of parallel chains, with each parallel chain being made up of a series of entrained master links and track links. Track chains further include a series of bushings and pins interposed between and connected to the parallel chains. The bushings and the entrained track links cooperate to form a number of track joints which allow the necessary movement of the bushings relative to the track links during use of the track chain, for example when the track chain rotates about the sprocket and the idler. Track joints are typically equipped with a track seal assembly to keep out various corrosive and abrasive mixtures of water, dirt, sand, rock or other mineral or chemical elements to which the track chain is exposed during its use. The track seal assembly also functions to keep a lubricant within the track joint to facilitate the aforementioned relative movement of the bushings and the track links.

One prior art track seal assembly design used to accomplish the aforementioned functions employs a sealing member axially urged into sliding sealing engagement against a polished bushing face by a resilient rubber load ring. However, a number of problems have been encountered using this seal design over long periods of time.

One such problem relates to grooving of the bushing face. The mixtures of various abrasive particles found in the working environment of a track chain tend to make excellent grinding compounds which can wear grooves into the bushing face. If these grooves become sufficiently deep, the integrity of the track seal assembly can be compromised and abrasive particles can enter the track joint. These grooves also provide a path for lubricants contained within the track joint to leak out. Moreover, since the sealing member slidably contacts the bushing face (i.e. the bushing face is a dynamic sealing surface), a grooved or rough bushing face can accelerate the sealing member's wear as these two elements slide relative to each other. This acceleration can further degrade the integrity of the track seal assembly, thus increasing the probability that abrasive particles will enter the track joint. All of the above discussed problems can result in the premature failure of the track joint and thus the track chain.

Therefore, in light of the above discussion, it is apparent that an assembly for sealing a track joint in a track chain which addresses the aforementioned problems is desirable.

Following one approach, the present invention provides such a track seal assembly that eliminates the use of any of the track joint components (such as a bushing face) as a dynamic sealing surface. In another approach, the present invention provides a track seal assembly which has one or more of its components made of an extremely hard, corrosive and abrasive resistant compound, such as a ceramic material.

Using the above discussed approaches, the track seal assemblies of the present invention provide a durable, reliable, low cost solution to the previously described problems experienced with prior art sealing assemblies. The track seal assemblies of the present invention also isolate its ceramic components from potentially damaging forces generated during the use of the track chain. Moreover, the design of the disclosed track seal assemblies allow them to be retrofit into current track link geometry. Furthermore, track seal assemblies of the present invention eliminate the use of track joint components as dynamic sealing surfaces.

SUMMARY OF THE INVENTION

In accordance with one embodiment of the present invention, there is provided a track seal assembly adapted to seal a track joint. The track seal assembly includes a track link and a first ceramic seal member. The track seal assembly further includes a first spring member positioned between the track link and the first ceramic seal member. Additionally, the track seal assembly includes a bushing having an end face. The track seal assembly also includes a second ceramic seal member secured to the end face of the bushing, wherein the first ceramic seal member contacts the second ceramic seal member so as to form a seal interface.

Pursuant to another embodiment of the present invention, there is provided a track seal assembly adapted to seal a track joint. The track seal assembly includes a track link and a ceramic seal member. The track seal assembly further includes a spring member positioned between the track link and the first ceramic seal member. In addition, the track seal assembly includes a bushing having an end face, the end face having a counter bore which defines a sealing surface, wherein the spring member forces the ceramic seal member against the sealing surface so as to form a seal interface.

It is therefore an object of the present invention to provide a new and useful track seal assembly.

It is another object of the present invention to provide an improved track seal assembly.

It is still another object of the present invention to provide a track seal assembly which is durable.

It is another object of the present invention to provide a track seal assembly which does not require a smooth or polished bushing face.

It is still another object of the present invention to provide a track seal assembly which eliminates the use of track joint components as dynamic sealing surfaces.

It is moreover an object of the present invention to provide a track seal assembly which allows relative movement of a bushing and a track link while maintaining a seal.

The above and other objects, features, and advantages of the present invention will become apparent from the following description and attached drawings.

BRIEF DESCRIPTION OF THE DRAWINGS

FIG. 2 is a fragmentary elevational view of the track chain of FIG. 1 (note that the track shoes have been removed and part of the track chain is shown in a cross sectional view for clarity of description);

FIG. 3 is an enlarged view of the cross section shown in FIG. 2 ;

FIG. 4. is a an enlarged view of the track joint shown in FIG. 3;

FIG. 5. is an elevational view of the track seal assembly shown in FIG. 3, with the bushing, track link, track pin and thrust washer removed for clarity of description;

FIG. 6 is a view of the track seal assembly shown in FIG. 5, taken along line 6—6 of FIG. 5;

FIG. 7 is an enlarged cross sectional view of a second embodiment of the track seal assembly of the present invention.

DETAILED DESCRIPTION OF THE PREFERRED EMBODIMENTS

Figure 1:
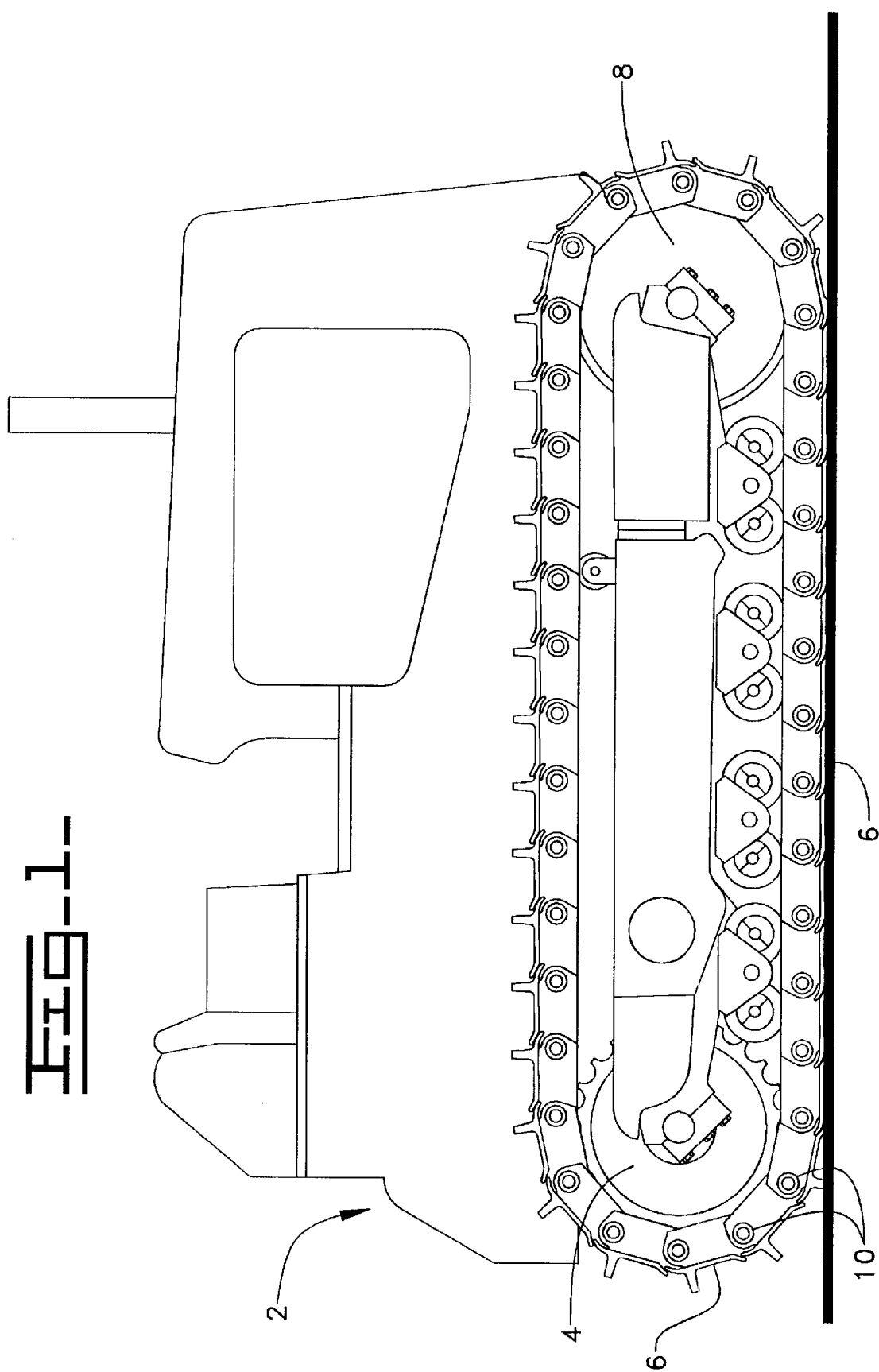
FIG. 1 is a fragmentary view of a crawler tractor having track shoes coupled to a track chain which incorporated the features of the present invention therein.

While the invention is susceptible to various modifications and alternative forms, specific embodiments thereof have been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Now referring to FIG. 1, there is shown a crawler tractor 2 having a sprocket 4, an idler 8, a track chain 10 entrained around sprocket 4 and idler 8, and a number of track shoes 6 attached to the track chain 10. In order to propel crawler tractor 2 over the ground, sprocket 4 rotates and engages track chain 10. This engagement and rotation causes track chain 10, along with the attached track shoes 6, to rotate around a path defined by sprocket 4 and idler 8. Rotation of track chain 10 and track shoes 6 around this path causes the track shoes 6 to engage the ground. The engagement of track shoes 6 with the ground causes the crawler tractor 2 to be propelled over the ground to perform various work functions.

Now referring to FIG. 2, there is shown a section of track chain 10 of FIG. 1, with track shoes 6 removed for clarity of description. Track chain 10 includes a series of master links 12 and track links 14 entrained to form a pair of parallel chains 15. Track chain 10 also includes a series of cylindrically shaped bushings 16 and track pins 18 interposed between and connecting parallel chains 15.

As shown by the cross sectional view indicated in circle 22, bushing 16 and track link 14 cooperate to form an annular track joint 20 which surrounds a track pin 18 contained within bushing 16 and track link 14. Track joint 20 allows for the radial and axial movement of bushing 16 and track link 14 relative to longitudinal axis 70 (see FIG. 3) of track pin 18 during use of track chain 10. Track joint 20 also allows for the rotational movement of bushing 16 relative to track link 14. These types of movement are necessary for using track chain 10 since it must articulate at each track joint 20 in order for track chain 10 to rotate about sprocket 4 and idler 8 during use of crawler tractor 2. Such movement can also occur when track shoes 6, which are coupled to track chain 10, encounter and drive over an obstacle such as a rock. Also shown in the cross sectional view indicated in circle 22 (see FIG. 3 for more detail), track joint 20 has disposed therein a track seal assembly 44 for keeping a lubricant in, and debris out of a portion of, track joint 20.

Track joint 20 and track seal assembly 44 will now be described in further detail with reference to FIGS. 3–6. FIG. 3 is an enlarged illustration of the cross sectional view shown in circle 22 of FIG. 2. As shown in FIG. 3, track pin 18 is contained within, and is supported by, bushing 16 and track link 14. Track link 14 has a track link counter bore 26, defined by an axial extending cylindrical surface 32 and a radially extending end surface 30. Cylindrically shaped bushing 16 has an end portion which defines a ring-shaped bushing face 28. Bushing face 28 is disposed in an opposing relationship to track link counter bore 26 to form track joint 20.

It should be understood that track joint 20 is an annular chamber which surrounds, and is in a substantially concentric relationship with, track pin 18. A thrust washer 24 is disposed intermediate bushing face 28 and radially extending end surface 30 to limit relative movement in the axial direction therebetween. A track seal assembly 44 is also disposed in track joint 20. It should also be understood that track seal assembly 44 and thrust washer 24 both form ring-like structures which are in a substantially concentric relationship with track pin 18.

The above described arrangement of the aforementioned components results in a sealed compartment 52 (see FIG. 4) being formed in track joint 20 by the cooperation of bushing face 28, track seal assembly 44, radially extending end surface 30 and track pin 18. Sealed compartment 52 functions to contain a lubricant for aiding in the articulation of bushing 16 and track link 14 at track joint 20. Track link 14 also includes a lubrication channel 42 (see FIG. 3) in fluid communication with sealed compartment 52 for the injection of a lubricant therein.

FIG. 4. is an enlarged view of track joint 20 shown in FIG. 3. As shown in FIG. 4, track seal assembly 44 includes an annular first ceramic sealing member 38, having a first cone surface 37 thereon. First ceramic sealing member 38 is attached to one edge of an annular elastomeric first support element 34. Track seal assembly 44 also includes an annular second ceramic sealing member 40, having a second cone interface 39 thereon. Second ceramic sealing member 40 is attached to one edge of an annular elastomeric second support element 36.

Preferably, first ceramic sealing member 38 and second ceramic sealing member 40 are made from any of the following materials, silicon carbide, aluminum oxide, zirconium oxide or silicon nitride.

First ceramic sealing member 38 and second ceramic sealing member 40 are preferably attached to first support element 34 and second support element 36, respectively, using any appropriate adhesive. It should be understood that the adhesive engagement between first ceramic sealing member 38 and first support element 34, and between second ceramic sealing member 40 and second support element 36, prevents any relative movement between these elements and provides a static seal therebetween during operation of track joint 20.

First support element 34 is adhesively attached to bushing face 28 along an edge opposite to the one attached to first ceramic sealing member 38. First support element 34 is attached to bushing face 28 such that first ceramic sealing member 38 extends into track joint 20. The adhesive engagement of first support element 34 with bushing face 28 prevents any relative rotational movement between these elements and provides a static seal therebetween during operation of track joint 20.

Second support element 36 is attached to radially extending end surface 30 with an adhesive along the edge opposite to the one attached to second ceramic sealing member 40.

Second support element 36 is attached to radially extending end surface 30 such that second ceramic sealing member 40 extends into track joint 20. As with first support element 34 and bushing face 28, the adhesive attachment of second support element 36 to radially extending end surface 30 prevents any relative movement therebetween. The aforementioned adhesive attachment also provides a static seal between these elements during operation of track joint 20. Second support element 36 is positioned on radially extending surface 30 such that second ceramic sealing member 40 and first ceramic sealing member 38 are held in sliding contact along their cone surfaces 37 and 39 to form cone sealing interface 46. Second support element 36 is also positioned on radially extending surface 30 such that first ceramic sealing member 38 and second ceramic sealing member 40 are radially urged (relative to longitudinal axis 70, of track pin 18) toward each other along cone sealing interface 46.

Well known processes relating to the size, shape and make up of first and second support elements 34 and 36, respectively, are used to design their urging function. The aforementioned characteristics of first support element 34 and second support 36 can be manipulated to provide the loads necessary to maintain the integrity of cone sealing interface 46 and therefore exclude debris from sealed compartment 52. However, it should be appreciated that the aforementioned characteristics of first support element 34 and second support element 36 must also be designed to allow the relative rotational movement between first ceramic sealing member 38 and second ceramic sealing member 40 along cone sealing interface 46. Further detail of how this relative rotational movement occurs during use of track chain 10 will be discussed in with reference to FIGS. 5 and 6.

Another important aspect of arranging the components of track seal assembly 44 in the above described manner, is that cone sealing interface 46 is the only dynamic interface in the system. This is true since first ceramic sealing member 38 and second ceramic sealing member 40 are the only elements in track joint 20 which slidably contact each other. As a result, track joint 20 components such as bushing face 28, are excluded from having any dynamic sealing functions.

Furthermore, it should be appreciated that cone sealing interface 46 is a ceramic on ceramic interface rather than a plastic and/or rubber on metal (such as bushing face) interface utilized by some prior art track seal assemblies. Since ceramic materials do not corrode and are nearly impervious to abrasive materials, the serious durability problems associated with using a plastic and/or rubber type sealing member in an abrasive or corrosive environment are avoided.

An important aspect of cone sealing interface 46 is that it is angled relative to the longitudinal axis 70 of track pin 18. Specifically, a cross section of first sealing member 38 and second sealing member 40 through cone sealing interface 46 (see FIG. 4) defines a line which intersects longitudinal axis 70 at an obtuse angle. It should be understood that having cone sealing interface 46 obtusely angled in the aforementioned manner has significant advantages. For example, the obtuse angle of cone sealing interface 46 prevents any axial movement (relative to longitudinal axis 70) between first sealing member 38 and second sealing member 40 during rapid axial movement (as illustrated by arrows 54 and 56 in FIG. 4) that typically occurs between bushing 16 and track link 14 during the use of track chain 10. This is true since it is inherently difficult for cone surfaces 37 and 39 (see FIG. 4) to slide over each other in the axial direction as a result of these surfaces being obtusely angled relative to longitudinal axis 70.

Furthermore, cone sealing interface 46 also aids in preventing any radial movement or slipping (relative to longitudinal axis 70) between first ceramic sealing member 38 and second ceramic sealing member 40 during rapid radial movements (as illustrated by arrows 55 and 57) that typically occur between bushing 16 and track link 14 during use of track chain 10. As mentioned above, this is true since it is inherently difficult for cone surfaces 37 and 39 (see FIG. 4) to slide relative to each other in the radial direction as a result of the interface of these two surfaces being obtusely angled relative to longitudinal axis 70.

The elastic nature of first support element 34 and second support element 36 also helps keep first ceramic sealing member 38 and second ceramic sealing member 40 in contact during the aforementioned axial movements of bushing 16 and track link 14. This is true since a support element made of an elastomeric material is able to stretch and compress under forces created by any relative movement between bushing 16 and track link 14. Therefore, an elastomeric material can accommodate this type of movement while keeping first and second ceramic sealing members 38 and 40, respectively, in contact. Therefore, the integrity of cone sealing interface 46 is maintained.

It should be appreciated that first ceramic sealing member 38 and second ceramic sealing member 40 are positioned between elastomeric first support element 34, and second support element 36, and thus are not in direct contact with a metal surface. This is important since ceramic is somewhat brittle and can crack or break if subjected to forces while in direct contact with a hard metallic surface. Therefore, it should be understood that the ability of elastomeric first support element 34 and elastomeric second support element 36 to stretch and compress helps to isolate first and second ceramic sealing members 38 and 40, respectively, from the potentially damaging forces generated during the movements of bushing 16 relative to track link 14.

It should also be appreciated that, as discussed above, bushing 16 and track link 14 typically move in radial directions (relative to longitudinal axis 70) as represented by arrows 55 and 57 during use of track claim 10. As previously discussed, first ceramic sealing member 38 and second ceramic sealing member 40 are attached to bushing 16 and track link 14, respectively. Therefore, first ceramic sealing member 38 and second ceramic sealing member 40 also correspondingly move in the radial directions represented by arrows 55 and 57. Moreover, it is often the case that first ceramic sealing member 38 is forced to move in the radial direction indicated by arrow 57, while at the same time, second ceramic sealing member 40 is forced to move in the radial direction indicated by arrow 55. This type of radial movement can impart an undesirable shear force along cone sealing interface 46 and result in a potentially damaging stress on first ceramic sealing member 38 and second ceramic sealing member 40.

To address this problem, first and second support elements 34 and 36, respectively, are made of an elastomeric material designed to bend and flex in the same directions as indicated by arrows 55 and 57. Therefore, having first and second support elements 34 and 36, respectively, made from an elastomeric material accommodates the aforementioned radial movements. This accommodation reduces the shear force that is imparted along cone sealing interface 46 by these radial movements. Therefore, the stress on first ceramic sealing member 38 and second ceramic sealing member 40 is reduced.

Now referring to FIGS. 5 and 6, there are shown enlarged illustrations of track seal assembly 44 with the bushing 16, track pin 18, thrust washer 24 and the track link 14 removed for clarity of description. FIG. 6 is a view of track seal assembly 44 taken along line 6—6 of FIG. 5. As can be seen in FIG. 5, first support element 34 and first sealing member 38 form a first ring 41. While second support element 36 and second sealing member 40 form a second ring 43. Note that only one half of the rings 41 and 43 are shown for clarity of description. First ring 41 and second ring 43 slidably contact each other along cone sealing interface 46 to form track seal assembly 44. As previously discussed, track seal assembly 44 defines an annulus in a substantially coaxial relationship with track pin 18 (track pin 18 is not shown; however, longitudinal axis 70 of track pin 18 is illustrated).

As shown in FIG. 6, first ring 41 and second ring 43 are capable of rotational movement relative to each other. During this rotational movement, the first ring 41 and the second ring 43 are in frictional contact with each other at cone sealing interface 46. For example, first ring 41 can be rotated in a clockwise direction as indicated by arrow 48, while second ring 43 is being rotated in a counterclockwise direction as indicated by arrow 50. Also, first ring 41 can be rotated in the direction indicated by arrow 50 (counter clockwise), while second ring 43 is being moved in the direction indicated by arrow 48 (clockwise).

An example of how the above described relative movement between rings 41 and 43 can occur during use of track seal assembly 44 in track joint 20 (not shown; see FIGS. 3 and 4) is as follows. As previously discussed, the components of first ring 41 (i.e. first support element 34 and first ceramic sealing member 38) do not rotate relative to each other or relative to bushing 16. Additionally, the components of second ring 43 (i.e. second support element 36 and second ceramic sealing member 40) do not rotate relative to each other or relative to track link 14. Therefore, if during the use of track chain 10, bushing 16 has rotational movement around its longitudinal axis in the direction indicated by arrow 48, and track link 14 has rotational movement around its longitudinal axis in the direction indicated by arrow 50, there must be a corresponding relative rotation along cone sealing interface 46 between first ring 41 and second ring 43. An important aspect of the ability of track seal assembly 44 to move in the above described manner is that it allows the relative rotational movement of bushing 16 and track link 14 while maintaining the integrity of sealed compartment 52. Therefore, a lubricant is effectively retained within and debris is effectively excluded from, sealed compartment 52.

Now referring to FIG. 7, there is shown a view of a bushing 66, a track link 62, a track pin 64 and a track joint 68 similar to the one shown in FIG. 3. Specifically, track joint 68 defines an annular chamber in coaxial relationship with track pin 64. Moreover, as with track joint 20 (see FIG. 3), track joint 68 is formed by cylindrical bushing 66 having a bushing face 78 thereon, wherein bushing face 78 is positioned in an opposing relationship to a track link counter bore 63 (see discussion relating to FIG. 3).

Disposed within track joint 68 are a thrust washer 72 and a track seal assembly 74. Track seal assembly 74 is a second embodiment of the track seal assembly of the present invention. Track seal assembly 74 includes an annular elastomeric support element 58 adhesively attached and extending from a radially extending end surface 65 of the track link counter bore 63. Track seal assembly 74 also includes a ceramic sealing member 60 adhesively attached to an edge of the support element 58. Support element 58 is positioned and adhesively attached to radially extending end surface 65 of track link counter bore 63 such that sealing member 60 is held in sliding engagement with a lip 76 which projects out of bushing face 78, thereby forming a dynamic sealing interface therebetween. Note that ceramic sealing member 60 does not come into contact with bushing face 78. It should also be understood that ceramic sealing member 60 and support element 58 form an annulus in a substantially coaxial relationship with track pin 64.

The aforementioned dynamic sealing interface results in the formation of a sealed compartment 69 inside track joint 68 for containing a lubricant, and excluding debris from a portion of track joint 68. The sealed compartment 69 is located between track pin 64 and track seal assembly 74.

Track seal assembly 74 is used in much the same way ( i.e. to exclude debris from sealed compartment 69, and to keep a lubricant therein), and has many of the advantages, as those discussed in reference to track seal 44 (i.e. allows relative rotational movement of bushing 66 and track link 62 while maintaining the integrity of sealed compartment 69, and has a ceramic sealing member). However, as shown in FIG. 7, ceramic sealing member 60 slidably engages lip 76 projecting out of bushing face 78 rather than a second sealing member as previously described with reference to FIGS. 2–6.

Based upon the above description it will be understood by those skilled in the art that the present invention provides a track seal assembly, wherein the sealing member does not come into contact with the bushing face and therefore does not require a smooth or polished bushing face to maintain the seal. Moreover, it will be understood by those skilled in the art that the present invention provides a track seal assembly, which is durable, and allows for the relative movement of the components of a track chain.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A track seal assembly adapted to seal a track joint, comprising:

a track link;

a first ceramic seal member;

a bushing having an end face;

a first spring member secured to said bushing and said first ceramic seal;

a second ceramic seal member; and a second spring member secured to said track link wherein said first ceramic seal member contacts said second ceramic seal member so as to form a seal interface.

2. The track seal assembly of claim 1, wherein:

said first spring member includes a first elastomeric member, and said second spring member includes a second elastomeric member.

3. The track seal assembly of claim 2, wherein:

said first elastomeric member is adhesively secured to said bushing, and said second elastomeric member is adhesively secured to said end face of said track link.

4. The track seal assembly of claim 1, wherein:

said track link has a counter bore defined therein, and said first ceramic seal member is positioned within said counter bore of said track link.

5. The track seal assembly of claim 4, wherein said second ceramic seal member is positioned within said counter bore of said track link.

6. The track seal assembly of claim 1, wherein:

said first ceramic seal member has a ring-like shape, and said second ceramic seal member has a ring-like shape.

7. The track seal of claim 1, wherein:

said first ceramic seal member has a first beveled end portion, and said second ceramic seal member has second beveled end portion, said first beveled end portion of said first ceramic seal member contacts said second beveled end portion of said second ceramic seal member so as to form the seal interface.

8. The track seal assembly of claim 7, wherein:

said first beveled end portion is defined on a radially outer surface defined by said first ceramic seal member, and said second beveled end portion is defined on a radially inner surface defined by said second ceramic seal member.

* * * * *